(12) United States Patent
Mori et al.

(10) Patent No.: US 7,571,958 B2
(45) Date of Patent: Aug. 11, 2009

(54) SUNSHADE PANEL APPARATUS

(75) Inventors: Keiji Mori, Kariya (JP); Toshio Iwata, Okazaki (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 12 days.

(21) Appl. No.: 11/808,892

(22) Filed: Jun. 13, 2007

(65) Prior Publication Data
US 2008/0001439 A1    Jan. 3, 2008

(30) Foreign Application Priority Data
Jun. 14, 2006 (JP) ............................ 2006-164531

(51) Int. Cl.
*B60J 7/00* (2006.01)
(52) U.S. Cl. .................................... 296/214
(58) Field of Classification Search .................. 296/214
See application file for complete search history.

(56) References Cited

U.S. PATENT DOCUMENTS 6,669,279 B2 * 12/2003 Messerschmidt ....... 296/220.01
2003/0146650 A1 * 8/2003 Paul et al. ................... 296/214
2005/0285434 A1   12/2005 Mori et al.
2007/0126265 A1    6/2007 Mori

FOREIGN PATENT DOCUMENTS

| DE | 100 29 718 A1 | 12/2001 |
| DE | 101 06 432 A1 | 8/2002 |
| FR | 2 841 186 | 12/2003 |
| JP | 02-49933 | 10/1990 |
| JP | 2006-46637 | 2/2006 |

* cited by examiner

*Primary Examiner*—Dennis H Pedder
(74) *Attorney, Agent, or Firm*—Finnegan, Henderson, Farabow, Garrett & Dunner, LLP

(57) ABSTRACT

A sunshade panel apparatus includes, a plurality of sunshade panels including slide members, a guide rail having a guide groove extending to slide and guide the sunshade panels, a panel compartment, an engaging member including an engaged portion and an engaging portion, a connecting component having the engaging member and connecting the sunshade panels, wherein the engaged portion and the engaging portion are in the guide groove and are engaged with each other in a condition where the engaging portion is sandwiched between an inner surface of the guide groove and the engaged portion when the sunshade panels are in the closed state.

7 Claims, 13 Drawing Sheets

Front ←

SUNSHADE PANEL APPARATUS

CROSS REFERENCE TO RELATED APPLICATIONS

This application is based on and claims priority under 35 U.S.C § 119 with respect to Japanese Patent Application 2006-164531, filed on Jun. 14, 2006, the entire content of which is incorporated herein by reference.

FIELD OF THE INVENTION

This invention relates to a sunshade panel apparatus having a plurality of sunshade panels which are openable and closable.

BACKGROUND

In a sun roof apparatus provided with an opening portion at a roof of a vehicle, roof panels, which are fixed or movable, are employed at the roof opening portion. The roof panels are composed of glass plates which penetrate the outside light. In order to regulate the amount of the outside light penetrating the roof panel and coming into a vehicle cabin, for example, as disclosed in JP 2006-044637A, a sunshade panel apparatus is disposed below the roof panels. The sunshade panel apparatus is able to open and close a skylight portion provided at the interior member located in the ceiling of the vehicle cabin.

In the sunshade panel apparatus disclosed in JP 2006-044637A, a plurality of sunshade panels are provided. When the skylight portion is closed, the plurality of sunshade panels are arranged so as to be aligned in a forward and backward direction of the vehicle in an identical horizontal plane to block the outside light coming into the vehicle cabin. Also, when the skylight portion is opened to take in the outside light, the plurality of the sunshade panels are moved to a panel compartment provided at a rear of the opening portion of the roof, and are stored by overlapping each other in a vertical direction. In order to guide the movement of the sunshade panels, guide rails are disposed so as to extend in the forward and backward direction of the vehicle in the vicinity of both ends of the roof opening portion.

The sunshade panel apparatus described above is provided with connecting means for connecting the sunshades, which are aligned in the forward and backward direction, to each other. Each connecting means is provided with a link member and a spring. The link member is rotatably mounted to a rear end of one sunshade panel, from among the sunshade panels which are successively placed in the forward and backward direction, and also is mounted at a front end of the other sunshade panel. The spring exerts a biasing force against the link member.

The apparatus is controlled so that the sunshade panels are moved maintaining each predetermined position of the sunshade panels by turning the link member, from the closed state that each sunshade panels are arranged in the identical horizontal plane to the opened state that the sunshade panels are overlapped in the vertical direction to be stored.

As an example, refer to JP2006-044637A.

However, as in the known sunshade panel apparatus described above, a lot of components such as a rotational axial portion of the link member, a spring exerting the biasing force on the link member as well as the link member are required in the connecting means, which controls the sunshade panels to be placed at a predetermined position by way of turning the link member. For the reason, a large space is necessary for disposing the connecting means.

In designing of vehicles, in order to efficiently use a limited space of the vehicle cabin, the sunshade panels are disposed so as to be as close as possible to the roof panel in the vertical direction to enlarge the space for the vehicle cabin. In particular, it is necessary to secure a sufficient space between the ceiling of the vehicle cabin and the head of the passenger.

Thus, in the known sunshade panel apparatus, the connecting means is arranged at inside of the guide rails in the width direction of the vehicle to minimize the vertical dimension of the apparatus.

Further, the mechanical parts such as the connecting means are covered by the interior member so as to make the mechanical parts invisible. Thus, when the arrangement in which the connecting means are arranged at the inside of the guide rails is employed, the large space is necessary in the vehicle width direction for disposing the connecting means. Consequently, it is difficult to set the width of the skylight portion (refer to L of FIG. 6 of this application) large. As a result, it is not possible to sufficiently meet the needs for increasing the width of the skylight portion as much as possible.

The present invention has been made in view of the above circumstances, and provides a sunshade panel apparatus which allows the sunshade panels to be positioned close to a roof panel and also allows to realize the width of a larger skylight.

SUMMARY OF THE INVENTION

According to an aspect of the present invention, a sunshade panel apparatus includes a plurality of sunshade panels movably disposed below a roof panel adapted to be provided at a roof portion of a vehicle penetrating outside light into a vehicle cabin so as to regulate an amount of the outside light penetrating into the vehicle cabin and including slide members at both end portions in a width direction of the vehicle, a guide rail having a guide groove, the guide groove sandwiching the slide members and extending in a forward and backward direction of the vehicle so as to slide and guide the plurality of sunshade panels, a panel compartment located at a rear side of the guide rail and storing the sunshade panels, an engaging member including an engaged portion provided at one of the sunshade panels which are successively placed in the forward and backward direction of the vehicle, an engaging portion provided at the other one of the sunshade panels which are successively placed in the forward and backward direction and engageable with the engaged portion, a connecting component having the engaging member and connecting the sunshade panels with the engaging portion engaged with the engaged portion when the slide members are supported by the guide groove and the plurality of the sunshade panels are arranged to be aligned in the forward and backward direction of the vehicle in a horizontal plane and are in a closed state to block the outside light, wherein the engaged portion and the engaging portion are in the guide groove and are engaged with each other in a condition where the engaging portion is sandwiched between an inner surface of the guide groove and the engaged portion when the sunshade panels are in the closed state.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the sunshade panel apparatus 20 according to the present invention is described with reference to FIGS. 1 to 14.

Figure 1:
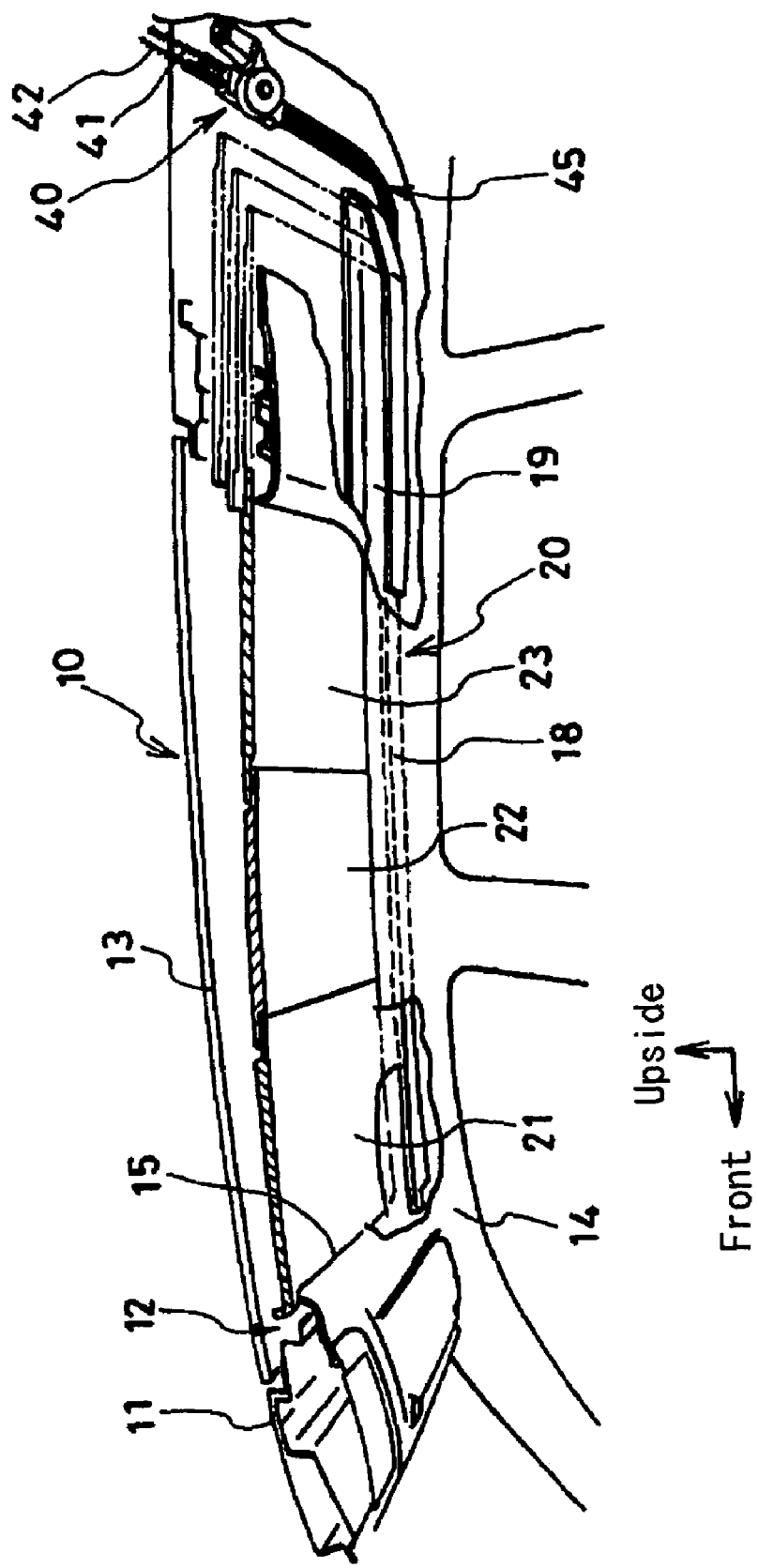
FIG. 1 is a sectional view of a sunshade panel apparatus at a center section in a width direction of a vehicle.

FIG. 1 illustrates cross sections of a sun roof apparatus 10 and a sunshade panel apparatus 20 at a center section in a width direction of a vehicle. The sun roof apparatus 10 and the sunshade panel apparatus 20 are provided at a roof portion 11 of the vehicle. Forward, upward, and any directions indicated by arrows in each figure show directions relative to the vehicle. An opening portion 12 is provided at the roof portion 11, and a roof panel 13, which is composed of a glass plate for penetrating the outside light, is attached on the opening portion 12.

Figure 5:
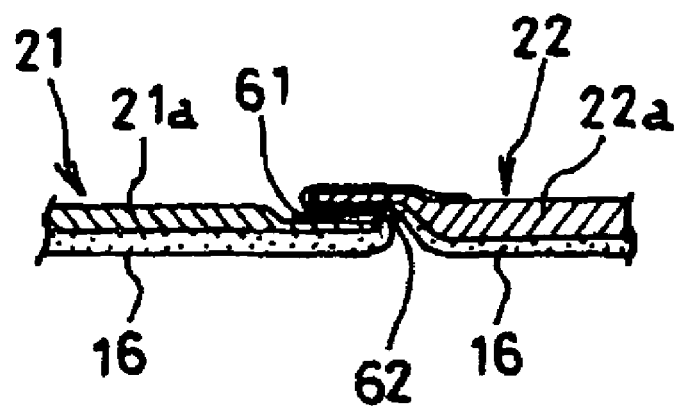
FIG. 5 is a sectional view taken from V-V of FIG. 2.

As illustrated in FIGS. 1 and 5, the sunshade panel apparatus 20 is mounted below the roof panel 13 so as to open and close a skylight portion 15, which is provided at an interior member 14. The interior member 14 is mounted to a ceiling portion of a vehicle cabin. The sunshade panel apparatus 20 is provided with a plurality of sunshade panels 21, 22 and 23 (as illustrated in FIG. 1, three panels are used in this embodiment). The sunshade panel apparatus 20 regulates the opening and the closing of the sunshade panels 21, 22, and 23 by moving the sunshade panels 21, 22, and 23 in a forward and backward direction to take in or block the outside light.

Figure 6:
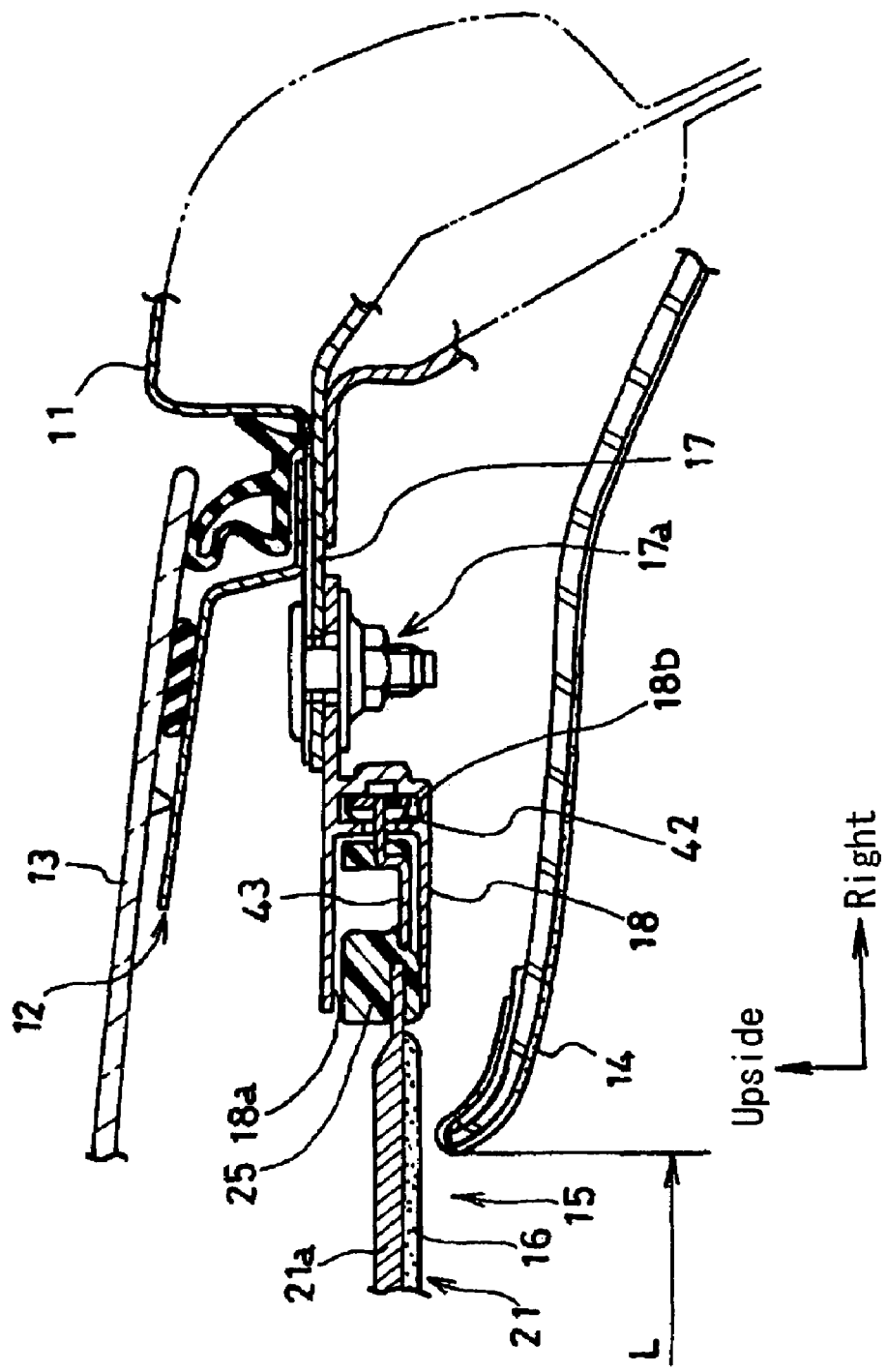
FIG. 6 is a sectional view taken from VI-VI of FIG. 2.
Figure 7:
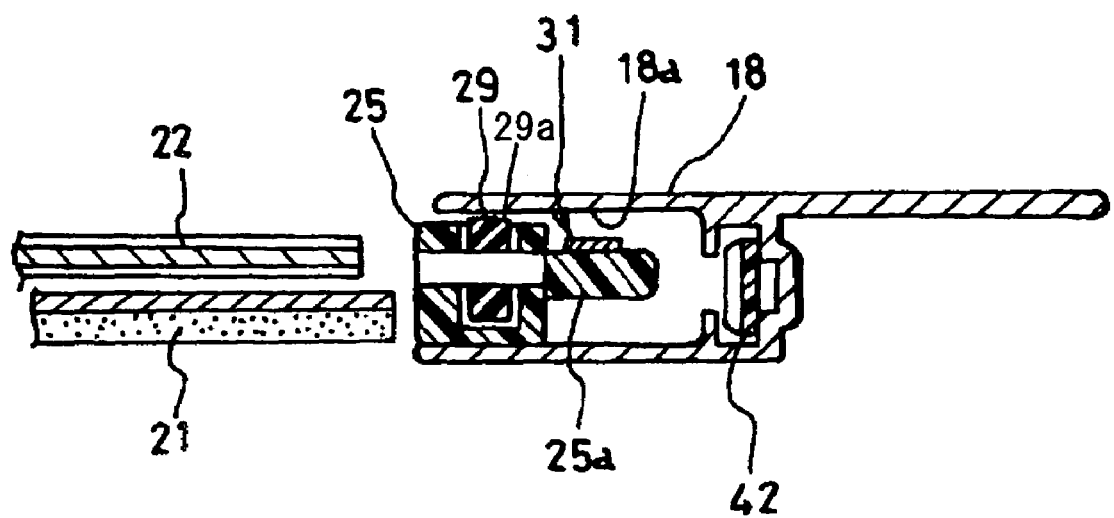
FIG. 7 is a sectional view taken from VII-VII of FIG. 2.
Figure 14:
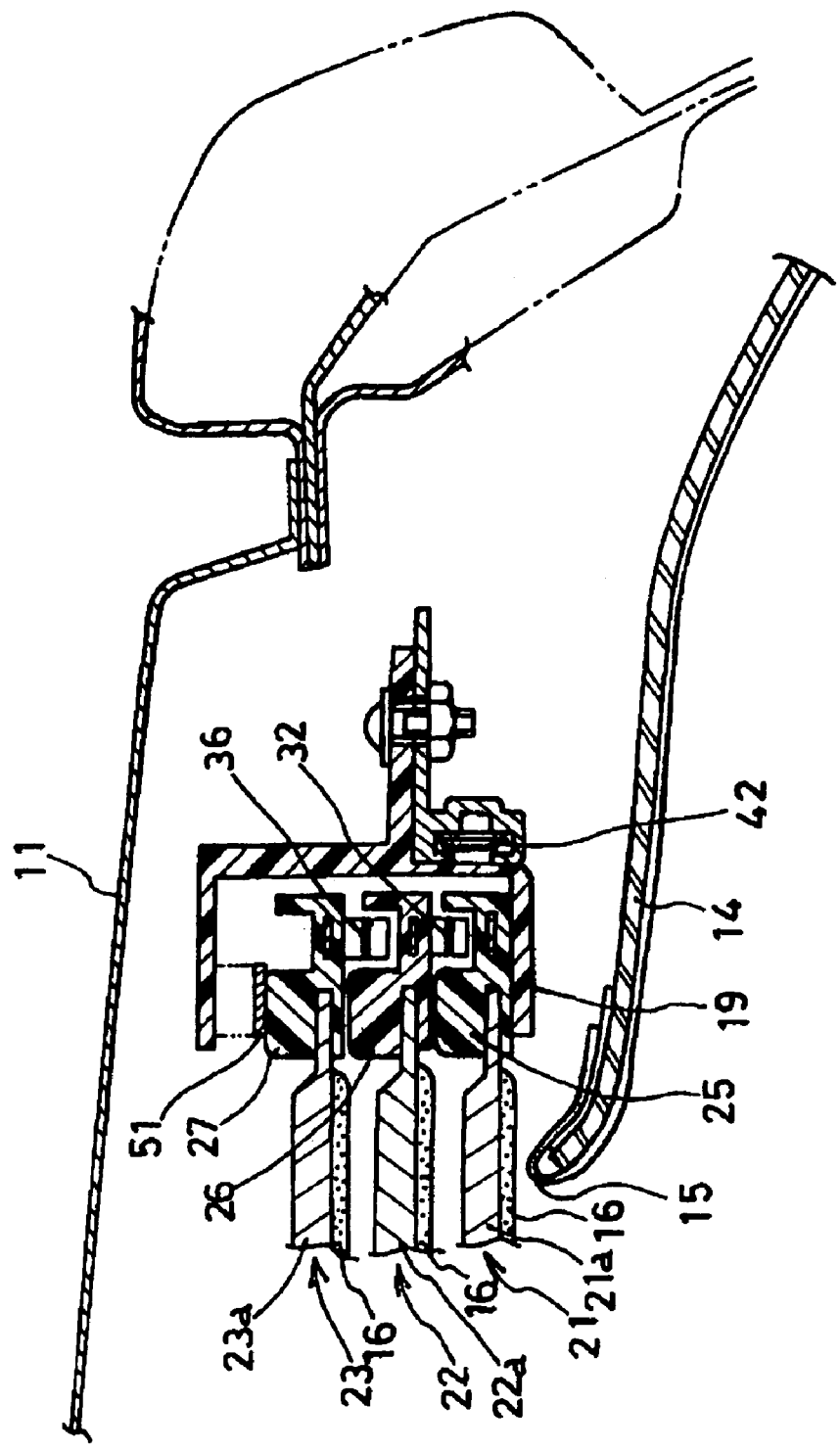
FIG. 14 is a sectional view taken along XIV-XIV of FIG. 13.

Further, FIGS. 5, 6 and 14 illustrate cross sections of each sunshade panel 21, 22, and 23. These sunshade panels 21, 22, and 23 have an identical structure. For example, panel main portions 21a, 22a and 23a, which are composed of a resin plate material made of urethane and the likes, are respectively provided at the sunshade panels 21,22 and 23. Also, slide members 25, 26, and 27 are integrally mounted on both end portions of each panel main portion 21a, 22a and 23a in the width direction of the vehicle. The slide members 25, 26 and 27 are made of a relatively hard resin. Further, surfaces, which exposes to the vehicle cabin, and end portions in the forward and backward direction of the panel main portions 21a, 22a and 23a are covered by a scarfskin 16 to provide a neat appearance as an interior material.

Next, as illustrated in FIG. 6, a mounting bracket 17 is provided at a ceiling portion of the roof portion 11 located in the vehicle cabin. A pair of the guide rails 18 extends in parallel to the forward and backward direction of the vehicle along both end sides of the opening 12 and is mounted to the mounting bracket 17 in the width direction of the vehicle with an engaging means 17a.

The left and right guide rails 18 are respectively provided with a U-shaped guide groove 18a. Further, the guide grooves 18a on the both sides face each other and opens toward a center of the vehicle. The slide members 25, 26 and 27 are inserted into the guide groove 18a to be slidable. As illustrated in FIG. 6, vertical thickness of the slide member 25 is set so as to be slightly smaller than vertical thickness of the guide groove 18a and the slide member 25 is smoothly guided in the forward and backward direction of the vehicle. The slide members 26 and 27 are configured in the same construction. With the above-described configuration, when the sunshade panel apparatus 20 supported by the guide rails 18 is in a closed state illustrated in FIG. 1, each sunshade panels 21,22, and 23 are arranged so as to be aligned in the forward and backward direction in an identical flat plane.

As illustrated in FIG. 1, a panel compartment 19 is disposed at rear of the left and right guide rails 18. When the sunshade panels 21,22, and 23 are in an opened state, the slide members 25, 26 and 27 are disposed in the panel compartment 19 so as to be overlapped one another. Details of the operation are described below.

Next, the structure of connecting means 30a and 30b connecting the sunshade panels 21, 22 and 23, which is related to the main characteristics of the present invention, will be described with reference mainly to FIG. 2. When the sunshade panel apparatus 20 is in the closed state, the connecting means 30a and 30b connect the sunshade panels which are successively placed in the forward and backward direction, from among the sunshade panels 21, 22 and 23. The front connecting mean 30a is provided between a rear end of the front slide member 25 and a front end of the intermediate slide member 26, and the rear connecting means 30b (refer to FIG. 8) is provided between a rear end of the intermediate slide member 26 and a front end of the rear slide member 27. Since these connecting means 30a and 30b have a similar structure, the structure is described mainly with a case of the connecting means 30a.

Figure 2:
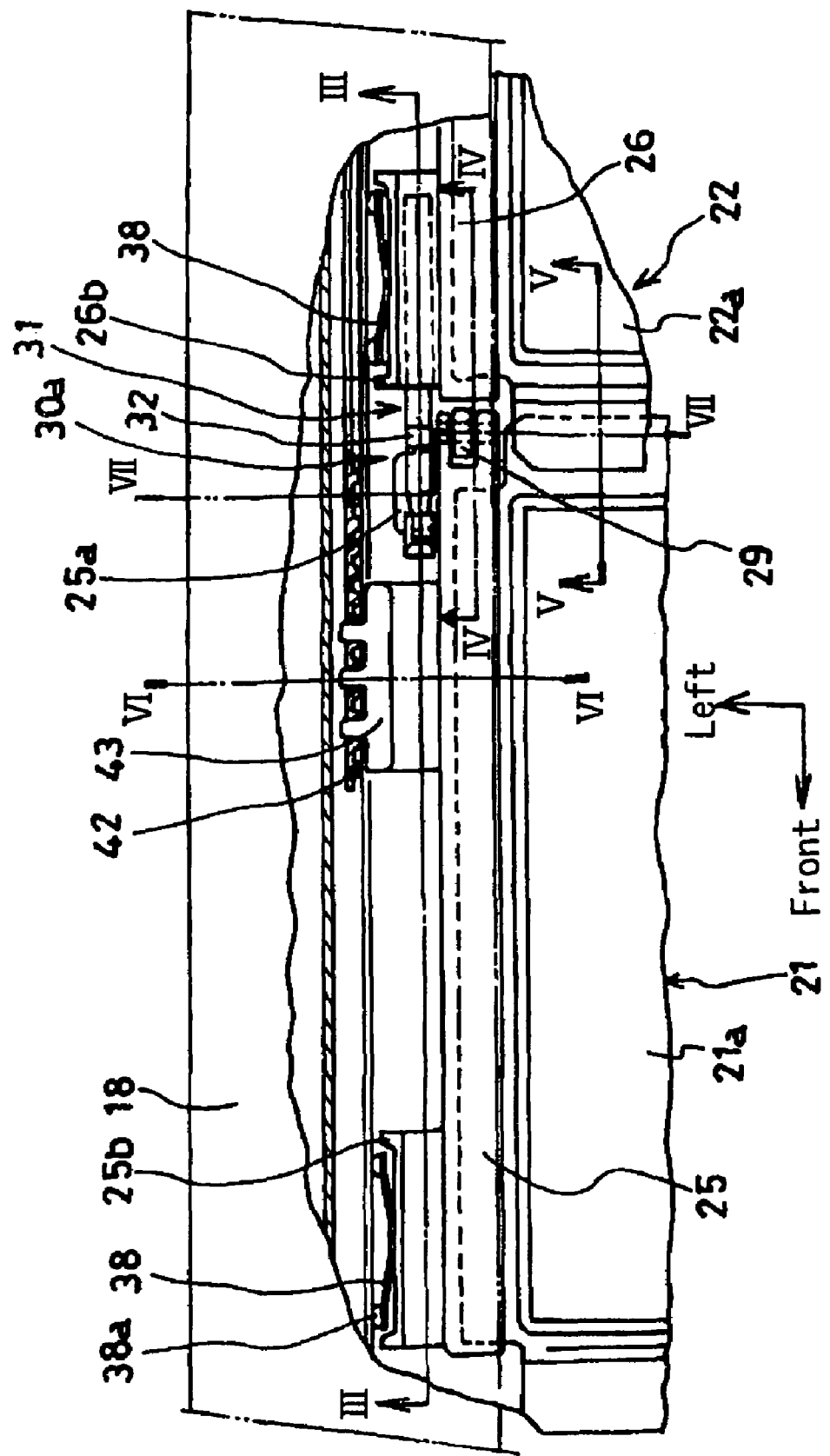
FIG. 2 is a plain view illustrating a left portion of the sunshade panel apparatus according to the present invention viewed upwardly from a vehicle cabin.
Figure 3:
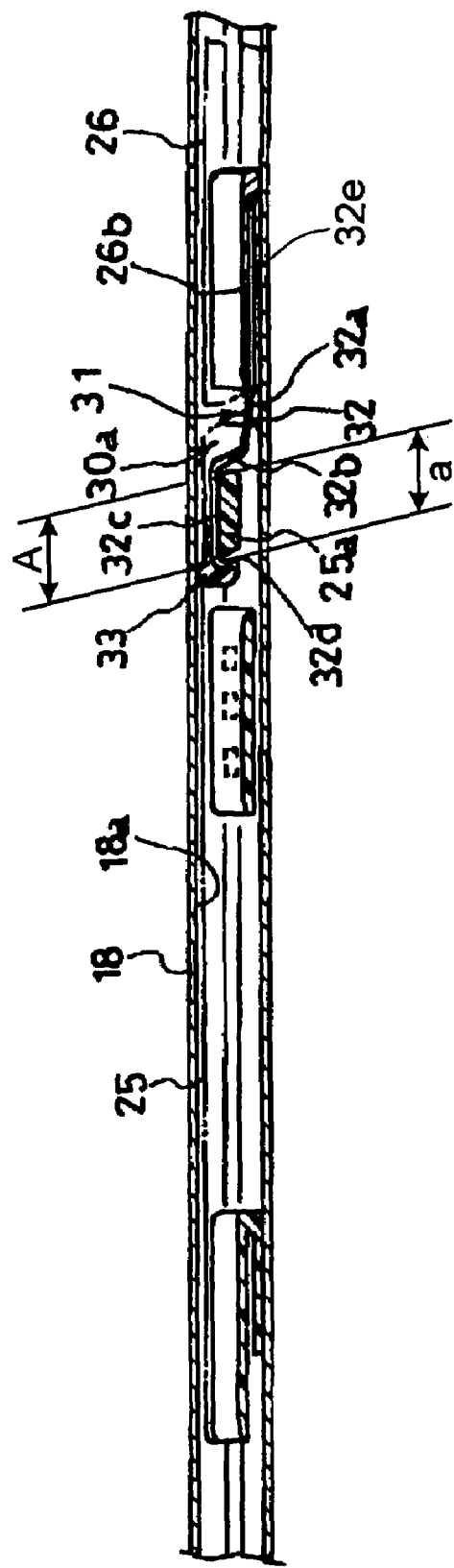
FIG. 3 is a sectional view taken from III-III of FIG. 2.

As illustrated in FIGS. 2 and 3, the connecting means 30a is composed of an engaged portion 25a formed in the slide member 25, and an engaging hook member 31 (engaging member) fixed at the side of the slide member 26. The connecting member 30a is a mechanism for restricting movements of the sunshade panel 21 and the sunshade panel 22 relative to each other in the forward and backward direction when the engaged portion 25a engages with the engaging hook member 31. The connecting means 30b is composed of an engaged portion 26a formed in the slide member 26 and an engaging hook member 35 (engaging member) fixed at the side of the slide member 27.

The engaged portion 25a is a planar shaped protrusion and extends horizontally by a predetermined width toward the outer side in the width direction of the vehicle at the rear end portion of the slide member 25. On the other hand, a hook portion 32 (engaging portion) forming the basic component of the looking hook member 31 is an elastic member composed by a thin plate spring. The hook portion 32 (engaging portion) is arranged so as to extend longitudinally with the planar shape of the thin plate extending in the width direction of the vehicle. A rear end of the hook portion 32 is inserted into a supporting protrusion 26b to be fixed. The supporting protrusions 26b are formed at a front end portion of the slide member 26 so as to protrude to the outer side in the width direction of the vehicle. Also, the other end of the hook portion 32 extends forward to the engaged portion 25a and the engaging hook member 35 of the connecting means 30b is provided with the hook portion 36 (engaging portion) forming a basic component thereof.

The hook portion 32 and 36 are provided with arm portions 32a and 36a, inclined surface portions 32b and 36b, pressing surface portions 32c and 36c, hook shaped portions 32d and 36d respectively in that order from each mounting portion 32e of the rear end toward the front. The arm portions 32a and 36a extend forward in a nearly horizontal direction. The inclined surface portions 32b and 36b bend and are brought obliquely upward. The surfaces 32c and 36c horizontally extend and the hook shaped portions 32d and 36d bend downward at a short portion of the front end.

As illustrated in FIG. 3, linear dimensions A in a forward direction of the pressing surface portion 32c and 36c are set to be approximately identical to a predetermined width a of the engaged portions 25a and 26a. Thus, it is possible to engage the engaged portion 25a and 26a with the hook shaped portions 32d and 36d and the inclined surface portions 32b and 36b as if the hook shaped portions 32d and 36d and the inclined surface portions 32d and 36d sandwich the engaged portions 25a and 26a in the forward and backward direction in a condition where the engaging hook members 31 and 35 engages with the engaged portions 25a and 26a respectively. Then, the sunshade panels 21, 22 and 23 are connected being restricted relative to each other in the forward and backward direction.

Figure 8:
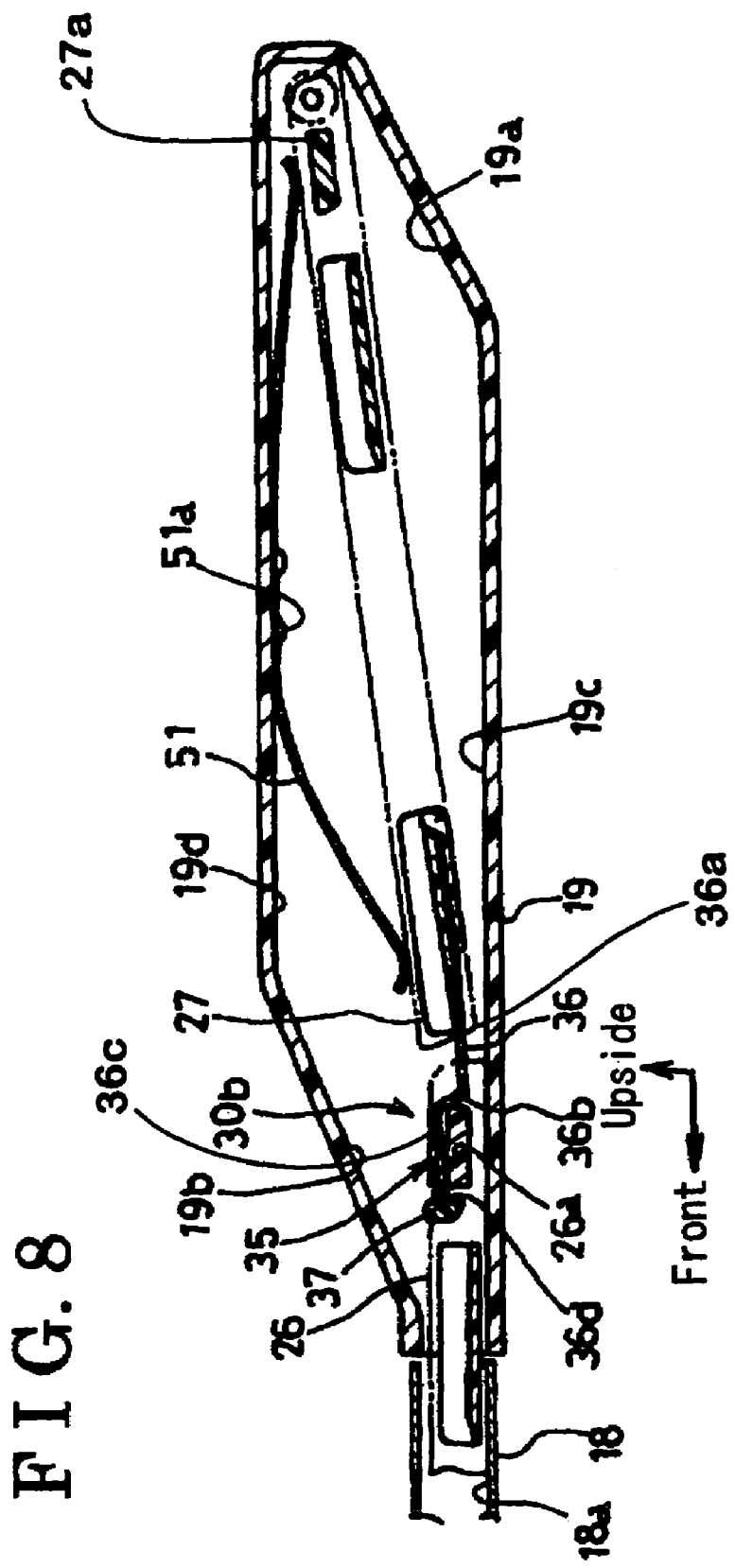
FIG. 8 is a sectional view illustrating a panel compartment of the sunshade panel apparatus according to the present invention.

As illustrated in FIGS. 3 and 8, sliding protrusions 33 and 37 are respectively mounted on upper portions of the hook shaped portions 32d and 36d of the hook portions 32 and 36. The sliding protrusion 33 is arranged so as to have a contact with or have a small clearance with the upper surface of the unshaped guide groove 18a when the connecting means 30a and 30b are positioned in the guide groove 18a. For this configuration, the engaging hook members 31 and 35 does not disengage from the engaged portions 25a and 26a due to the vibration occurred in the vehicle, and is good for configuring the connecting means 30a and 30b compactly.

Supporting protrusions which are similar to the supporting protrusion 26b are formed at the front end portions of the slide members 25 and 27 as well as the sliding member 26. (the supporting protrusions 25b of the slide member 25 are shown in FIG.2 and FIG.3, however, the supporting protrusions of the slide member 27 are not shown) As illustrated in FIG. 2, a sliding member 38 is inserted between a vertical wall surface of the guide groove 18a and the respective supporting protrusions. The sliding member 38 is a flat spring and the basic component thereof longitudinally extends. Sliding pieces 38a are bonded to both front and rear ends of the sliding member 38. The sliding member 38 is mounted so as to exert the biasing force from the pair of guide rails 18 on the sunshade panels 21, 22, and 23 as if sandwiching the sunshade panels 21, 22, and 23 from left and right sides. The configuration allows the sunshade panel apparatus to prevent the rattling of the sunshade panels 21, 22, and 23 occurred in the horizontal direction.

Figure 4:
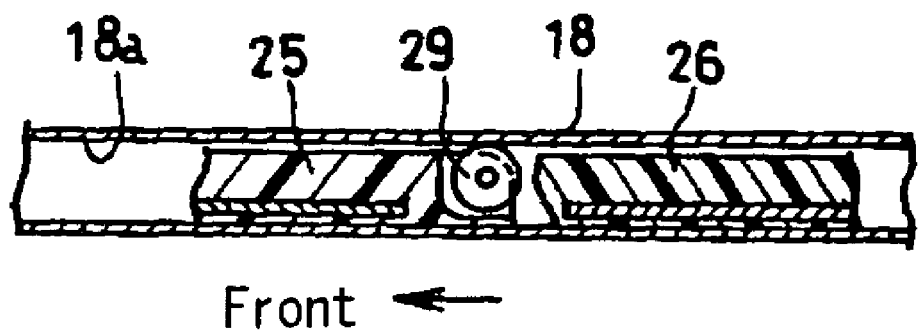
FIG. 4 is a sectional view taken from IV-IV of FIG. 2.

As illustrated in FIG. 4, at the rear end portion of the slide member 25, a roller 29 is rotatably mounted to the shaft, which is mounted to the slide member 25 so as to extend horizontally in the width direction of the vehicle. An outer peripheral surface 29a of the roller 29 is set so as to be positioned slightly higher than the upper surface of the slide member 25. The roller 29 functions for facilitating operation to move the sunshade panels 21, 22 and 23, which are described below, to the rear of the vehicle and arrange the panels so that the panels are overlapped. The roller 29 is mounted to each rear end portion of the slide members 26 and 27 in a similar way to the slide member 25.

Further, as illustrated in FIG. 5, a joint portion 61 is formed at the rear end portion of the sunshade panel 21 so that the joint portion 61 is formed to be thin at an upper surface side over the width direction of the vehicle. On the other hand, a joint portion 62 is formed at the front end portion of the sunshade panel 22 so that the joint portion 62 is formed to be thin at a lower surface side over the width direction of the vehicle. The joint portions 61 and 62 are able to overlap each other within a range which is nearly identical to thickness of the sunshade panels 21 and 22 and prevent the outside light from penetrating from the clearance between the sunshade panels 21 and 22. The similar joint portions are also provided between the sunshade panel 22 and the sunshade panel 23.

As illustrated in FIG. 1 and FIGS. 10 to 13, in the inner side of the panel compartment 19 provided at the rear side of the guide rail 18, a rear side guide surface 19a is formed at the rear side of the panel compartment 19 and the rear side guide surface 19a is inclined so that the rear portion thereof is brought up toward the rear side. Also, a front side guide surface 19b is formed at the front side of the panel compartment 19 and is inclined so as to be in parallel to the rear side guide surface 19a. That is, the panel compartment 19 presents a parallelogram formed by a bottom surface 19c, the front side guide surface 19a, the rear side guide surface 19b and an upper side surface 19d. Specifically, a bottom surface 19c is extended horizontally from the lower surface of the guide groove 18a of the guide rail 18, the upper ends of the rear and front side guide surfaces 19a and 19b are longitudinally connected, and the upper side surface 19d is formed so as to be in parallel to the bottom surface 19c and have a predetermined height from the bottom surface 19c.

The parallelogram configuration allows the panel compartment 19 to guide each sunshade panel 21, 22 and 23 and stores the panels in a small space by overlapping the panels when the sunshade panels are moved to the rear. Further, a pressure bar spring 51 is mounted on the upper side surface 19d of the panel compartment 19 for preventing the stored sunshade panels 21, 22 and 23 from making noise by vibration. The pressure bar spring 51 has a longitudinal long arc shape and curves so that both ends are lowered downward. The center portion of the pressure bar spring 51 is mounted to the lower surface of the upper side surface 19d via a fixing means 51a such as a screw.

As illustrated in FIGS. 1, 2, and 6, a driving device 40, whose driving source is a motor, is installed at the rear of the panel compartment 19 in the sunshade panel apparatus 20. The driving device 40 is provided with a pair of flexible resin racks 41 and 42 and the flexible resin rack 41 and 42 are movable in a reverse direction relative to each other in response to the operation of the driving device 40. The flexible resin racks 41 and 42 are respectively guided to a right portion and a left portion of the roof portion 11 by a guide tube 45 which bends and inserted into a cable guide hole 18b, which is formed at the guide rail 18, from a rear end thereof.

The distal end portions of the flexible resin racks 41 and 42 are connected to a bracket 43, which is integrally provided at the slide member 25 of the front sunshade panel 21, when the sunshade panel apparatus is in the closed state. Thus, when the driving device 40 is operated, each distal end portion of the left and right flexible resin racks 41 and 42 are synchronized to move in the forward and backward direction of the vehicle and the sunshade panel 21 moves in the forward and backward direction. At this point, the intermediate and rear sunshade panels 22 and 23, which are connected to the sunshade panel 21, also move in the forward and backward direction. As described above, the configuration allows the sunshade panel apparatus 20 to perform the opening and closing operations.

The operation of the sunshade panel apparatus 20 as configured above will be described.

Figure 9:
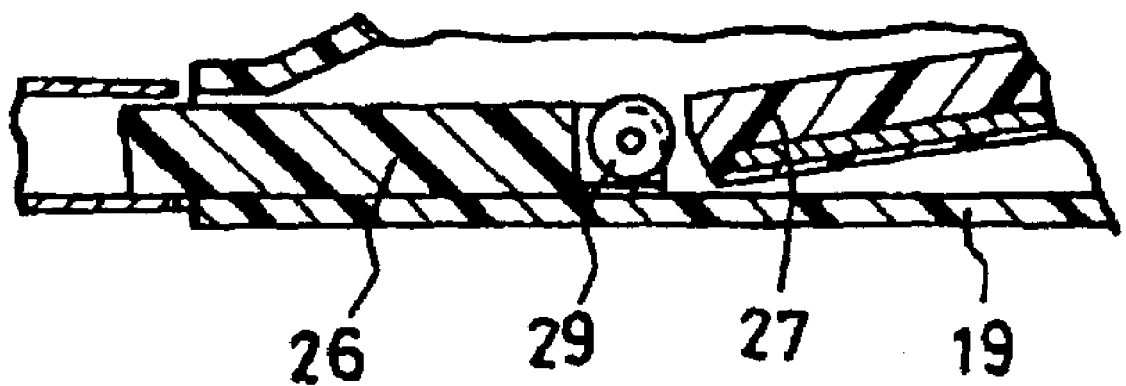
FIG. 9 is a partial sectional view for illustrating a positional relationship of a roller and a slide member in a state illustrated in FIG. 8.

As illustrated from FIG. 1 to FIG. 7, when the sunshade panels 21, 22 and 23 are aligned in the forward and backward direction in the identical flat plane being supported by the guide rail 18, the skylight portion 15 is closed. In the above state, a passenger operates a switch (not shown) to activate the driving device 40 to open the sunshade panels 21, 22 and 23, and the sunshade panel 21 starts moving to the rear of the vehicle. Consequently, the sunshade panels 22 and 23, connected to the sunshade panel 21 by the connecting means 30a and 30b, move to the rear together. Then, as illustrated in FIG. 8, firstly, the slide member 27 of the rear sunshade panel 23 enters into the panel compartment 19. The rear end of the slide member 27 comes in contact with the rear side guide surface 19a and is brought upwardly along the inclined surface against the biasing force of the pressure bar spring 13. At this point, as illustrated in FIG. 9, the roller 29 mounted to the rear end of the slide member 26 is not in contact with the distal end portion of the slide member 27.

Figure 10:
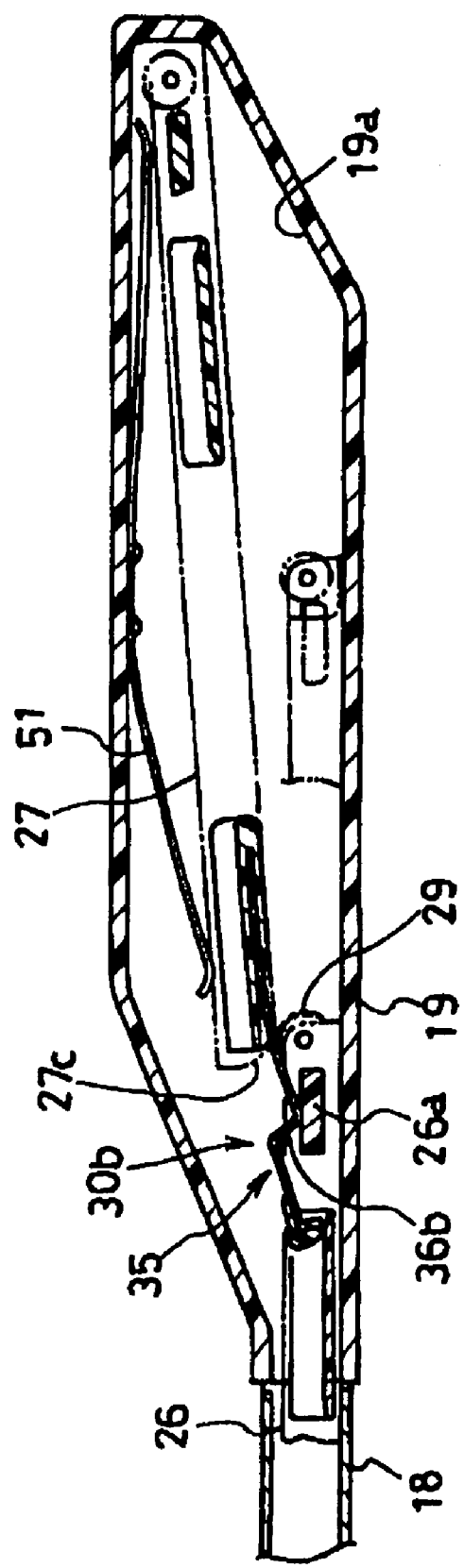
FIG. 10 is a sectional view illustrating the process of storing the sunshade panels from the state illustrated in FIG. 8.

From the above-described state, the operation proceeds to a state illustrated in FIG. 10, the operation of the driving device 40 is maintained in a condition where the rear end of the slide member 27 reaches in the vicinity of the highest portion of the rear side guide surface 19a. As a result, the rear end portion of the engaged portion 26a of the intermediate slide member 26 start sliding on the inclined surface portion 36b. Then, the engagement of the engaged portion 26a and the engaging hook member 35 is released to bring up the front portion of the slide member 27 against the biasing force of the pressure bar spring 51. The hook portion 36 of the engaging hook member 35 is molded so that the distal end portion of the hook portion 36 is deflected downwardly in a free state in which the hook portion 36 is disengaged from the engaged portion 26a as illustrated in FIG. 10. For the reason, the biasing force of the pressure bar spring 51 and an elastic restoring force are set to be balanced therebetween. Thus, it is possible to bring up the front end portion of the slide member 27 without the occurrence of the operational resistance.

Figure 11:
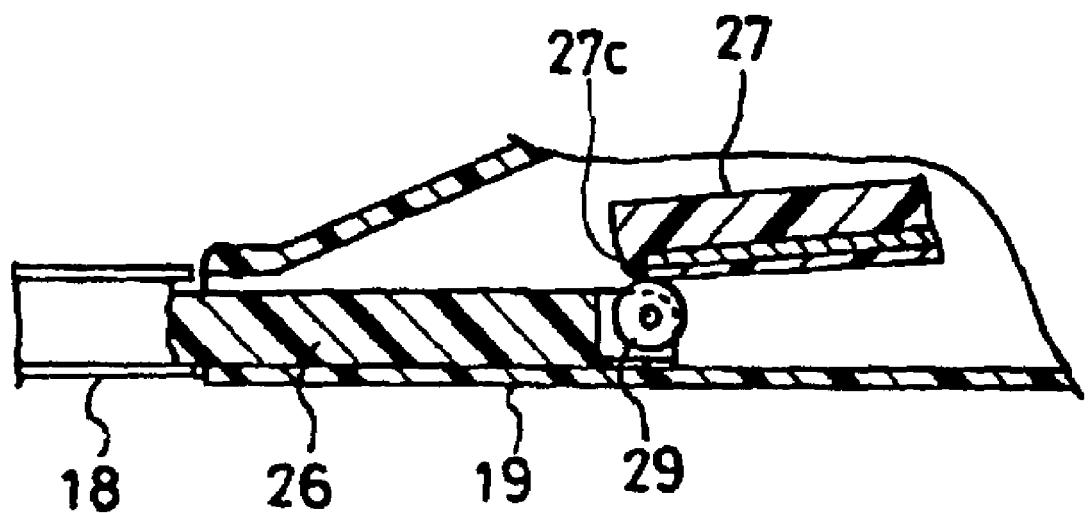
FIG. 11 is a partial sectional view illustrating the positional relationship between the roller and the slide member in a state illustrated in FIG. 10.

Once the engaging hook member 35 is disengaged from the engaged portion 26a, and the front end portion of the slide member 27 is brought up. Then, as illustrated in FIG. 11, the roller 29 located at the rear end of the slide member 26 comes in contact with the front end portion of the slide member 27 and rolls on the inclined surface portion 27c formed in the front end portion to bring up the front end portion of the slide member 27 smoothly. As a result, the slide member 26 enters under the slide member 27 so as to overlap each other.

As described above, when the slide member 27 is stored in the panel compartment 19, the upward movement of the front end of the slide member 27 is not restricted, thus the front end of the slide member 27 is easily brought up. Also, the engagement between the engaged portion 25a and the engaging hook member 32 is easily released. On the other hand, the engagement between the engaged portion 25a of the slide member 25 and the engaging hook member 35 mounted to the slide member 26 is not released at this point, because the slide member 26 is in the guide groove 18a and its upward movement is restricted.

Figure 12:
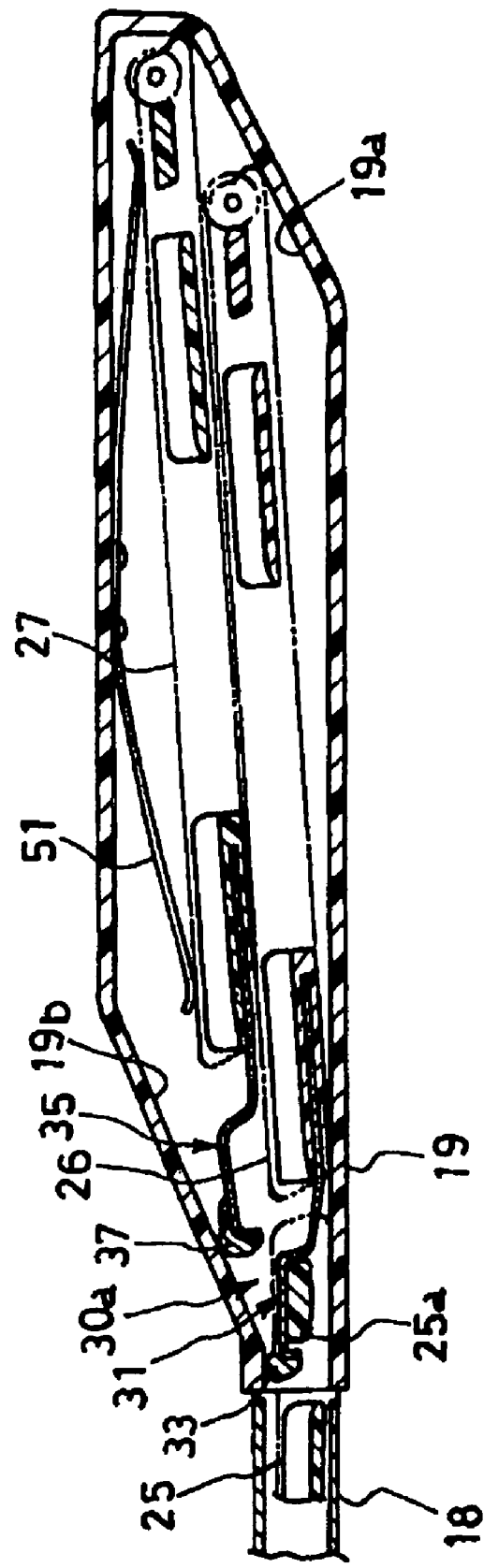
FIG. 12 is a sectional view illustrating a state that two sunshade panels are stored in a panel compartment.
Figure 13:
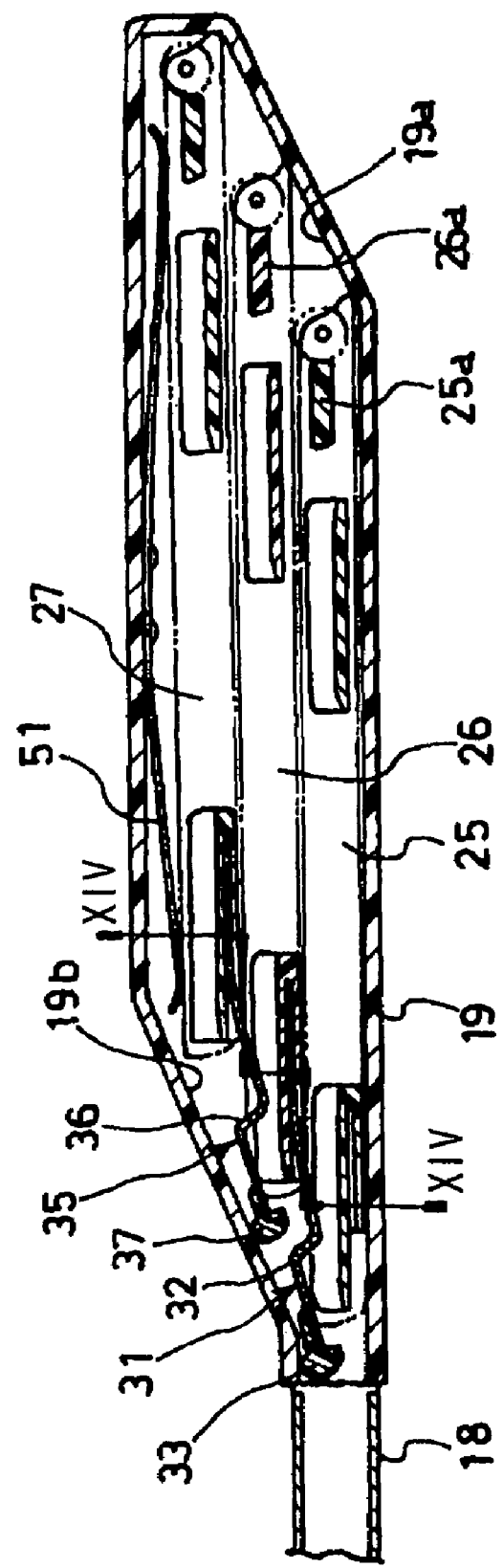
FIG. 13 is a sectional view illustrating a state that all sunshade panels of the sunshade panel apparatus according to the present invention is stored in the panel compartment.

The slide member 25 moves to the rear of the vehicle from the state illustrated in FIG. 12 to the state illustrated in FIG. 13, and thus the connecting means 30a is released in a similar way to the case of the connecting means 30b. As a result, the operation enters the states illustrated in FIGS. 13 and 14, and all the sunshade panels are stored in the panel compartment 19. Then, the sunshade panel apparatus 20 opens the skylight portion 15. Thus, the outside light penetrates the roof panel 13 and is taken into the vehicle cabin.

When the sunshade panel apparatus 20 is operated to be back in the closed state, the switch (not shown) is turned to a closing direction. Firstly, the driving device 40 is driven so that the sunshade panel 21 moves to the front of the vehicle. The engaged portion 25a of the slide member 25 of the sunshade panel 21 moves to a position where the engaging hook 35 of the slide member 26 is located, the engaging portion 25a engages with the engaging hook member 35. At this point, the hook portion 36 of the engaging hook member 35 is in the free state and the distal end portion of the hook portion 36 is deflected downwardly to securely engage with the engaged portion 26a; Then, the sunshade panels 21 and 22 are connected and move to the front together. The driving device 40 is further operated and thus the sunshade panels 22 and 23 are connected in the similar way, the sunshade panel apparatus 20 is back to the closed state.

According to the above configuration, in the sunshade panel apparatus according to the invention, when the sunshade panels are in the closed state, the engaging portion and the engaged portion of the engaging member of the connecting means are in the guide groove and are engaged in the condition where the engaging portion is sandwiched between the inner surface of the guide groove and the engaged portion. The configuration allows the connecting means to be disposed at the outer side in the vehicle width direction, compared to the known sunshade panel apparatus, in which the connecting means is disposed at the inner side of the guide rails. In addition, it is possible to dispose the sunshade panels to be as close as the known sunshade panel apparatus to the roof panel. Therefore, in the sunshade panel apparatus, it is possible to set the width of the skylight larger and realize the sun roof apparatus which is more spacious.

According to the above configuration, the engaging member is configured by the flat spring having the planar shape and the engaging member is positioned so that the planar shape of the flat spring is in a horizontal direction. Thus, it is possible to compactly secure the size of the guide groove of the guide rails in the vertical direction. Therefore, the space for the vehicle cabin is not decreased. Further, with the configuration in which the flat spring is employed for composing the engaging member, it is possible to decrease the number of the components, compared to the known apparatus. Therefore, it is possible to produce the apparatus with a lower cost.

According to the above configuration, when the sunshade panels are in the closed state, the engaging portion, which engages with the engaged portion, is not disengaged from the engaged portion by the guide groove. Thus, even if the size of the engaging portion between the engaging portion and the engaged portion is reduced to configure the connecting means more compactly, it is possible to maintain the reliable engagement between the engaging portion and engaged portion.

According to the above structure, when the sunshade panels are stored in the panel compartment, the pressing force exerts on the sunshade panels by the pressing bar spring. Thus, it is possible to prevent the rattling which makes big noise even by the vibration occurred in the vehicle.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A sunshade panel apparatus comprising:
    a plurality of sunshade panels movably disposed below a roof panel adapted to be provided at a roof portion of a vehicle penetrating outside light into a vehicle cabin so as to regulate an amount of the outside light penetrating into the vehicle cabin and including slide members at both end portions in a width direction of the vehicle;
    a guide rail having a guide groove, the guide groove sandwiching the slide members and extending in a forward and backward direction of the vehicle so as to slide and guide the plurality of sunshade panels;
    a panel compartment located at a rear side of the guide rail and storing the sunshade panels; and
    an engaging member including:
        an engaged portion provided at one of the sunshade panels which are successively placed in the forward and backward direction of the vehicle;
        an engaging portion provided at the other one of the sunshade panels which are successively placed in the forward and backward direction and, wherein the engaging portion has a hook shaped portion at a first end engageable with the engaged portion;
    wherein the engaging member connects the sunshade panels with the engaging portion engaged with the engaged portion when the slide members are supported by the guide groove and the plurality of the sunshade panels are arranged to be aligned in the forward and backward direction of the vehicle in a horizontal plane and are in a closed state to block the outside light,
    wherein the engaged portion and the engaging portion are in the guide groove and are engaged with each other in a condition where the engaging portion is sandwiched between an inner surface of the guide groove and the engaged portion when the sunshade panels are in the closed state; and
    wherein the engaging portion of the connection means is configured by a flat spring having a planar shape and extending in the forward and backward direction of the vehicle, and the engaging portion is mounted so that one end of the engaging portion is fixed to the slide member and the other end of the engaging portion is engageable with the engaged portion and the planar shape is configured to be in the horizontal direction.

2. A sunshade apparatus according to claim 1, wherein a clearance between the engaging portion engaging with the engaged portion and the inner surface of the guide groove is set to be within a distance preventing the engaging portion from disengaging from the engaged portion when the sunshade panels are in the closed state.

3. A sunshade panel apparatus according to claim 1, further comprising:
    a pressure bar spring mounted in inside of the panel compartment so as to exert a pressing force on the sunshade panels by being deformed by the sunshade panel when the sunshade panels are moved to the rear of the vehicle and are overlapped in a vertical direction to be stored in the panel compartment.

4. A sunshade panel apparatus according to claim 1, wherein the engaging portion includes:
    an arm portion horizontally extending forward;
    an inclined surface portion bending and brought obliquely upward; and
    a pressing surface portion;
    wherein the first end with the hook shaped portion is the front end.

5. A sunshade panel apparatus according to claim 4, wherein linear dimension in a forward direction of the pressing surface portion is set so as to be approximately identical to a predetermined width of the engaged portion, and the engaged portion is sandwiched by the hook shaped portion and the inclined surface portion in the forward and backward direction of the vehicle with the engaging portion engaged with the engaged portion.

6. A sunshade panel apparatus comprising:
    a plurality of sunshade panels movable disposed below a roof panel adapted to be provided at a roof portion of a vehicle penetrating outside light into a vehicle cabin so as to regulate an amount of the outside light penetrating into the vehicle cabin and including slide members at both end portions in a width direction of the vehicle;
    a guide rail having a guide groove, the guide groove sandwiching the slide members and extending in a forward and backward direction of the vehicle so as to slide and guide the plurality of sunshade panels;
    a panel compartment located at a rear side of the guide rail and storing the sunshade panels;
    an engaging member including:
        an engaged portion provided at one of the sunshade panels which are successively placed in the forward and backward direction of the vehicle;
        an engaging portion provided at the other one of the sunshade panels which are successively placed in the forward and backward direction and, wherein the engaging portion has a hook shaped portion at a first end engageable with the engaged portion;
    wherein the engaging member connects the sunshade panels with the engaging portion engaged with the engaged portion when the slide members are supported by the guide groove and the plurality of the sunshade panels are arranged to be aligned in the forward and backward direction of the vehicle in a horizontal plane and are in a closed state to block the outside light, and
    wherein the engaged portion and the engaging portion are in the guide groove and are engaged with each other in a condition where the engaging portion is sandwiched between an inner surface of the guide groove and the engaged portion when the sunshade panels are in the closed state;

a pressure bar spring mounted in inside of the panel compartment so as to exert a pressing force on the sunshade panels by being deformed by the sunshade panel when the sunshade panels are moved to the rear of the vehicle and are overlapped in a vertical direction to be stored in the panel compartment; and a roller which is rotatably mounted to a shaft mounted so as to horizontally extend in the width direction of the vehicle and an outer peripheral surface of the roller is set to be higher than an upper surface of the slide member.

7. A sunshade panel apparatus according to claim 6, wherein a clearance between the engaging portion engaging with the engaged portion and the inner surface of the guide groove is set to be within a distance preventing the engaging portion from disengaging from the engaged portion when the sunshade panels are in the closed state.

* * * * *

UNITED STATES PATENT AND TRADEMARK OFFICE
CERTIFICATE OF CORRECTION

PATENT NO. : 7,571,958 B2  
APPLICATION NO. : 11/808892  
DATED : August 11, 2009  
INVENTOR(S) : Keiji Mori It is certified that error appears in the above-identified patent and that said Letters Patent is hereby corrected as shown below:

Claim 5, col. 10, line 26, "wherein linear" should read --wherein a linear--.

Signed and Sealed this

Thirteenth Day of October, 2009

David J. Kappos  
*Director of the United States Patent and Trademark Office*